United States Patent
Chen

(10) Patent No.: US 7,730,337 B2
(45) Date of Patent: Jun. 1, 2010

(54) METHOD AND APPARATUS FOR ASSERTING A HARDWARE PIN TO DISABLE A DATA BUS CONNECTING A PROCESSOR AND A CHIPSET DURING POWER SAVING STATE

(75) Inventor: Jen-Chieh Chen, Taipei (TW)

(73) Assignee: VIA Technologies, Inc., Taipei (TW)

( * ) Notice: Subject to any disclaimer, the term of this patent is extended or adjusted under 35 U.S.C. 154(b) by 745 days.

(21) Appl. No.: 11/626,622

(22) Filed: Jan. 24, 2007

(65) Prior Publication Data

US 2008/0178026 A1    Jul. 24, 2008

(51) Int. Cl.
G06F 1/32    (2006.01)
G06F 1/00    (2006.01)
(52) U.S. Cl. .................. 713/320; 713/300; 713/323
(58) Field of Classification Search .................. 713/300
See application file for complete search history.

(56) References Cited

U.S. PATENT DOCUMENTS

| | | | | |
|---|---|---|---|---|
| 5,729,683 A | * | 3/1998 | Le et al. | 709/237 |
| 6,073,195 A | * | 6/2000 | Okada | 710/301 |
| 7,152,167 B2 | * | 12/2006 | Kurts et al. | 713/300 |
| 7,529,955 B2 | * | 5/2009 | Kurts et al. | 713/300 |
| 2003/0126485 A1 | * | 7/2003 | Wilcox et al. | 713/320 |
| 2004/0117670 A1 | * | 6/2004 | Kurts et al. | 713/300 |
| 2006/0168460 A1 | | 7/2006 | Hsiao et al. | |

FOREIGN PATENT DOCUMENTS

CN    1540539    10/2004

\* cited by examiner

Primary Examiner—Suresh K Suryawanshi
(74) Attorney, Agent, or Firm—Thomas, Kayden, Horstemeyer & Risley

(57) ABSTRACT

A power saving method is disclosed. A halt instruction is issued to enable transition from an operational state to a power saving state. The processor broadcasts a message to a chipset. The chipset receives the sleep message and enters a power saving state, and asserts a hardware pin to disable a data bus connecting the processor and the chipset. It is determined whether a request for data transaction required during the power saving process is issued to the chipset. If the request is issued to the chipset, the chipset deasserts the hardware pin to enable the data bus, transmits the request to the processor; and, when data transaction is complete, asserts the hardware pin by the chipset to disable the data bus.

17 Claims, 4 Drawing Sheets

METHOD AND APPARATUS FOR ASSERTING A HARDWARE PIN TO DISABLE A DATA BUS CONNECTING A PROCESSOR AND A CHIPSET DURING POWER SAVING STATE

BACKGROUND OF THE INVENTION

1. Field of the Invention

The invention relates to power management, and more particularly to a power saving method for a computer system.

2. Description of the Related Art

FIG. 1 is a schematic view of a computer system.

The computer system 100 comprises a processor 110 and a chipset 130. Chipset 130 further comprises an interrupt controller 131 and a SMC 133, coupled to processor 110 via a lightning data transport (LDT) bus. When an operating system of computer 100 operates, an LDT_STOP pin is deasserted (connection, LDTSTOP#=HIGH) using SMC 133 to enable the LDT bus, thereby enabling data transmission between processor 110 and chipset 130. When the operating system enters a power saving mode, processor 110 issues a halt instruction to enter the C1 state (a power saving state) from the C0 state (an operational state).

Next, processor 110 broadcasts a sleep message to other components (such as chipset 130, device 150, and others) to reduce system resource consumption, by, for example, lowering operational frequency, voltage, and the like, while the LDT_STOP pin is still deasserted (connection, LDTSTOP#=HIGH) such that the LDT bus is still enabled. If device 150 sends an interrupt request (IRQ) to chipset 130, interrupt controller 131 receives and transmits the IRQ to processor 110. When receiving the IRQ, processor 110 is waked up from the C1 state (a power saving state) to the C0 state (an operational state) while the LDT_STOP pin is still deasserted (connection, LDTSTOP#=HIGH) that the LDT bus is still enabled.

As described, the LDT_STOP pin is always deasserted (connection, LDTSTOP#=HIGH) even if computer system 100 and processor 110 enter a power saving mode (C1 state), wasting system resources or power. Thus, an improved power saving method and apparatus is desirable.

BRIEF SUMMARY OF THE INVENTION

Power saving method is provided. An exemplary embodiment of a power saving method comprises the following. A halt instruction is performed to enable a process to enter a power saving state from an operational state. The processor broadcasts a sleep to a chipset. The chipset receives the sleep message, enters a power saving mode, and asserts a hardware pin to disable a data bus connecting the processor and the chipset. It is determined whether a request for data transaction required during the power saving process is issued to the chipset. If the request is issued to the chipset, the chipset deasserts the hardware pin to enable the data bus, transmits the request to the processor; and, when data transaction is complete, asserts the hardware pin by the chipset to disable the data bus.

A computer system is provided. An exemplary embodiment of the computer system comprises a processor and a chipset. The processor issues a halt instruction for transition from an operational state to a power saving state and broadcasts a sleep message. The first chipset receives the sleep message and enters a power saving state, asserts a hardware pin to disable a data bus connecting the processor, determines whether a request for data transaction is received during the power saving status, if the request is received, deasserts the hardware pin to enable the data bus, and transmits the request to the processor, and, when data transaction is complete, asserts the hardware pin to disable the data bus.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
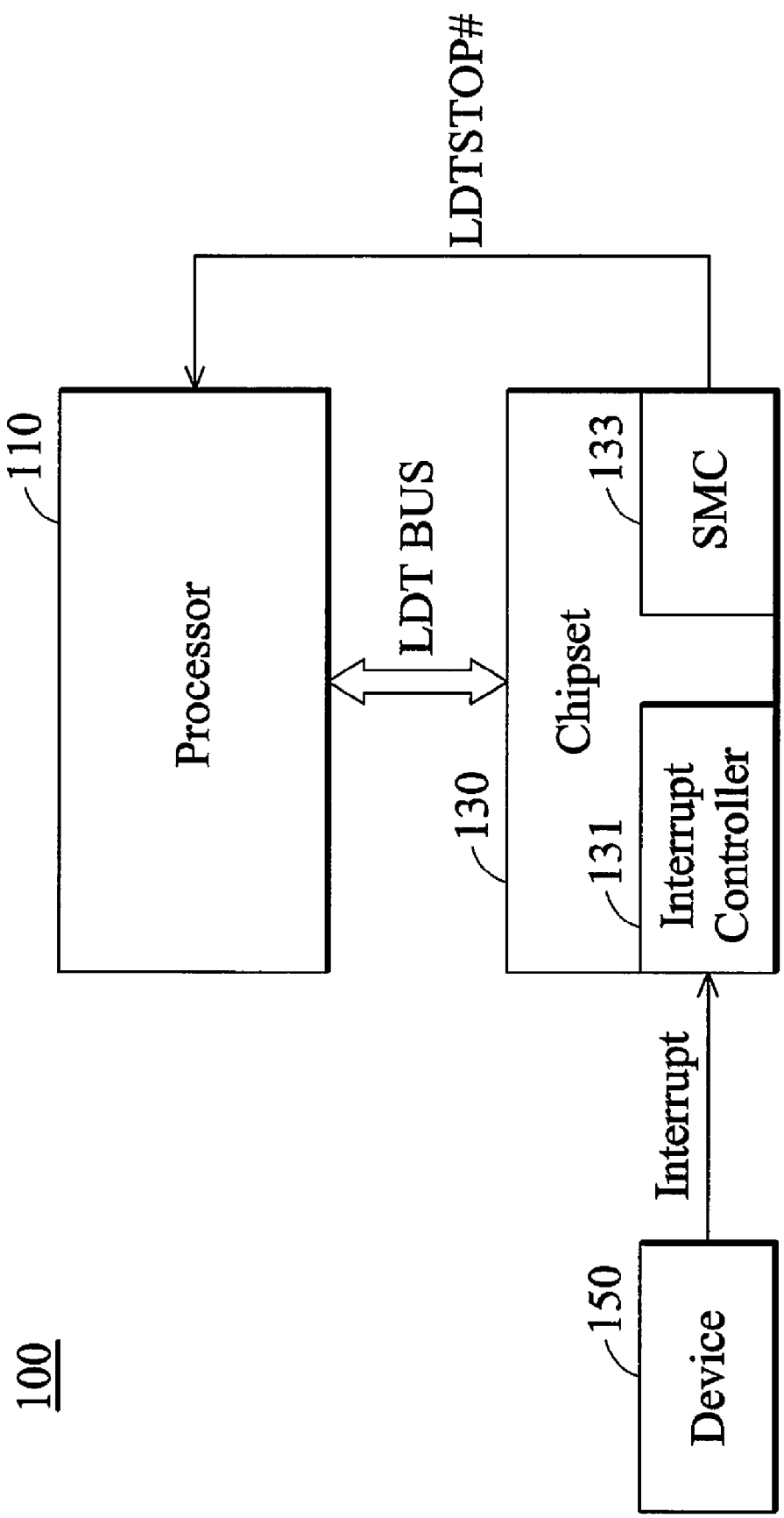
FIG. 1 is a schematic view of a computer system.

Several exemplary embodiments of the invention are described with reference to FIGS. 1 through 4, which generally relate to reducing power consumption of a computer system. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a computer system and a power saving method for the computer system.

Figure 2:
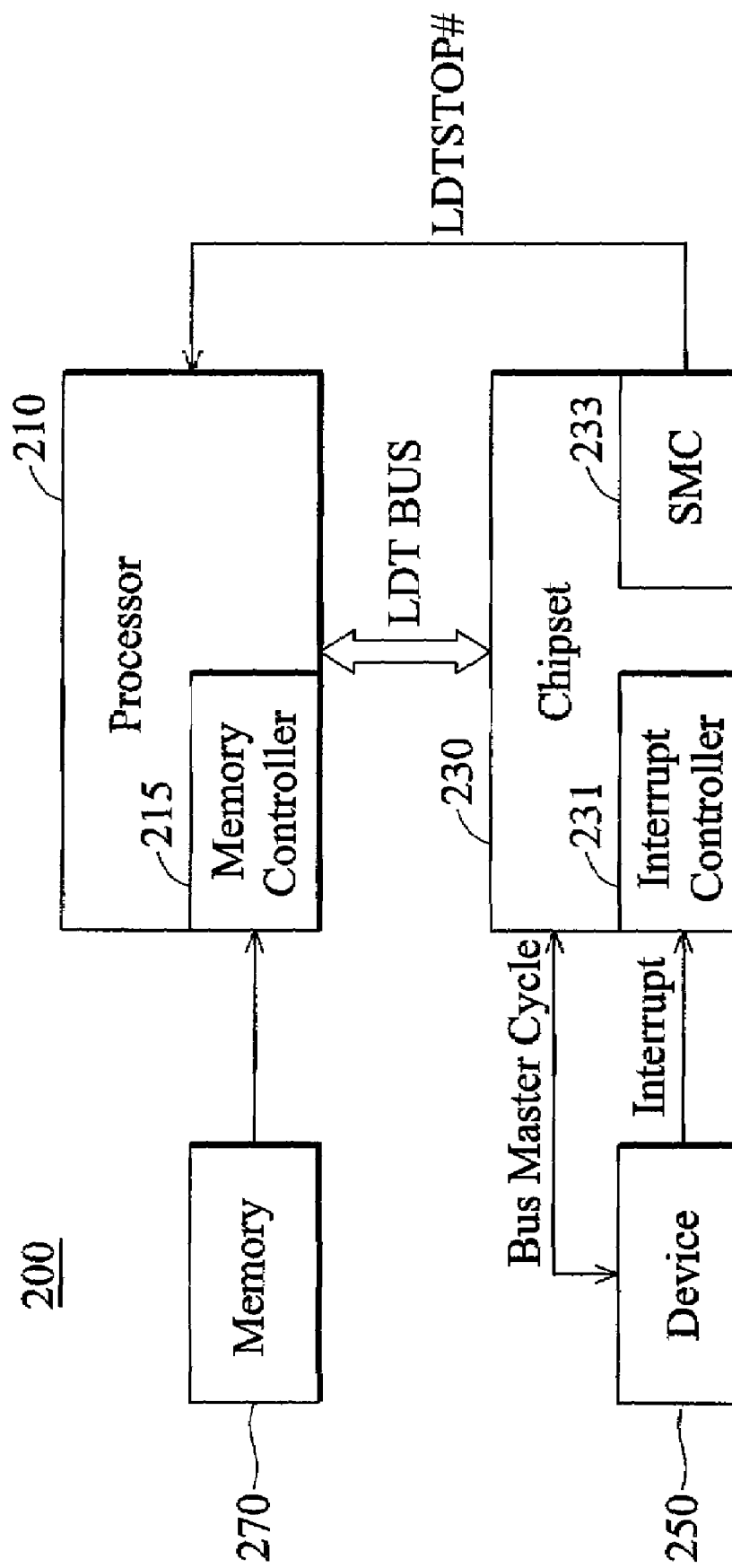
FIG. 2 is a schematic view of an embodiment of a computer system.

FIG. 2 is a schematic view of an embodiment of a computer system.

The computer system 200 comprises a processor 210 and a chipset 230. Processor 210 further comprises a memory controller 215. Chipset 230 further comprises an interrupt controller 231 and a SMC 233, coupled to processor 210 via an LDT bus. When an operating system of computer system 200 is operating, an LDT_STOP pin is deasserted (connection, LDTSTOP#=HIGH) using SMC 233 to enable the LDT bus, thereby enabling data transmission between processor 210 and chipset 230. When the operating system enters a power saving mode, processor 210 performs a halt instruction to enter the C1 state (a power saving state) from the C0 state (an operational state).

Next, processor 210 broadcasts a sleep message (defined as a halt special cycle herein) to chipset 230. When receiving the sleep message, chipset 230 enters a power saving state (defined as a chipset C1 state herein) and asserts the LDT_STOP pin (disconnection, LDTSTOP#=LOW) using SMC 233 to disable the LDT bus to reduce LDT bus power consumption.

When a data transaction is required during the power saving process, device 250 issues a request (defined as a bus master cycle herein) to chipset 230. When receiving the request, chipset 230 deasserts the LDT_STOP pin (connection, LDTSTOP#=HIGH) using SMC 233 to enable the LDT bus. The request is transmitted to processor 210 and memory controller 215 of processor 210 accesses data from or writes data to memory 270. When the data transaction is complete, chipset 230 asserts the LDT_STOP pin (disconnection, LDTSTOP#=LOW) using SMC 233 to disable the LDT bus.

It is noted that processor 210 is still in state C1 and chipset 230 is still in the power saving state (the chipset C1 state) when the described process is implemented.

When device 250 sends an IRQ to chipset 230, interrupt controller 231 receives the IRQ and chipset 230 wakes from the power saving state (the chipset C1 state) and deasserts the LDT_STOP pin (connection, LDTSTOP#=HIGH) using SMC 233 to enable the LDT bus. Chipset 230 then transmits the IRQ to processor 210 via the LDT bus and processor 210 is waked up from the C1 state (a power saving state) to the C0 state (an operational state).

Figure 3:
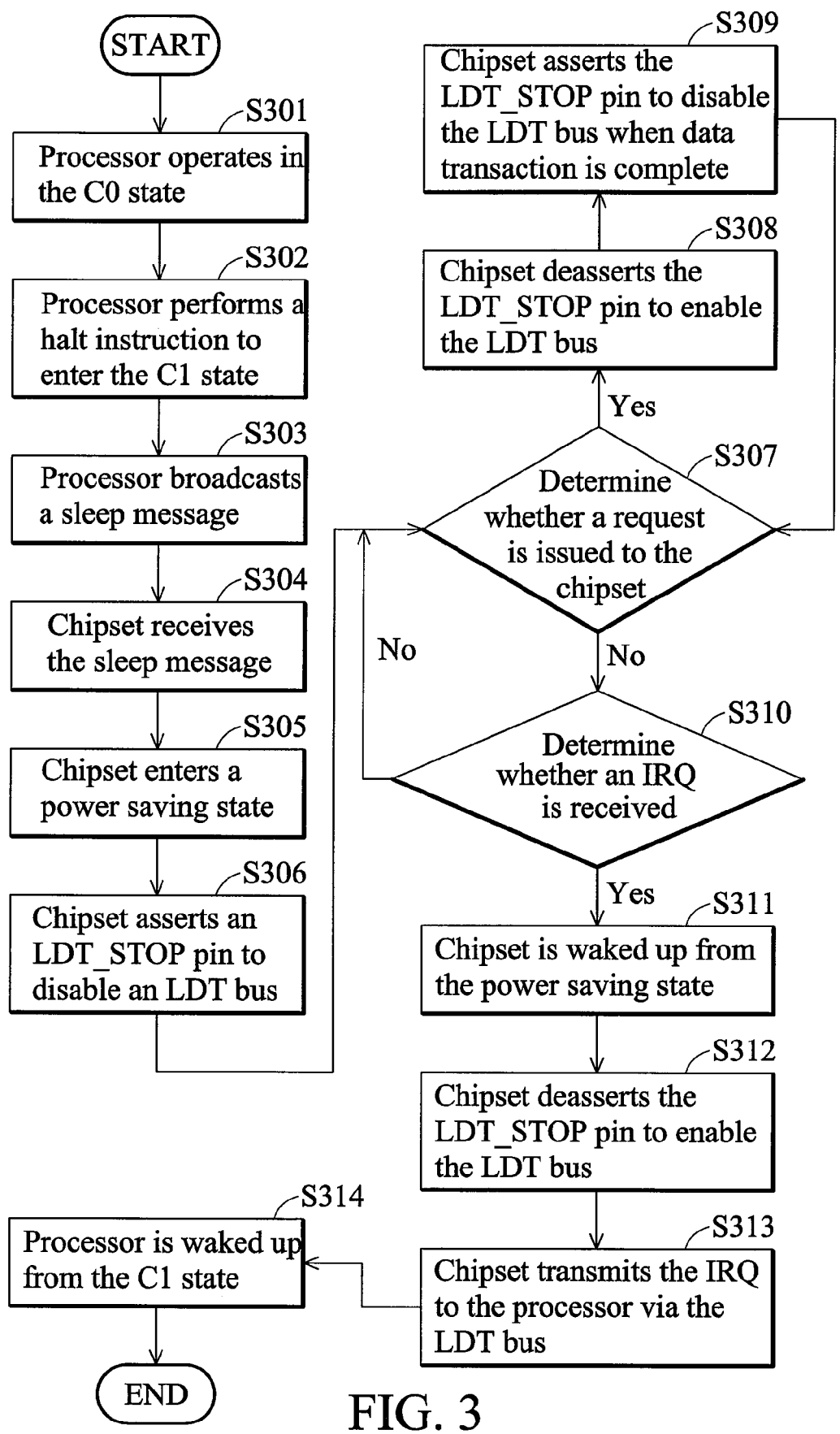
FIG. 3 is a flowchart of an embodiment of a power saving method.

FIG. 3 is a flowchart of an embodiment of a power saving method.

A process of a computer system first operates in the C0 state (an operational state) (step S301) and performs a halt instruction to enter the state C1 (a power saving state) (step S302). Next, the processor broadcasts a sleep message (defined as a halt special cycle herein) to other hardware components, comprising a chipset of the computer system (step S303). The chipset receives the sleep message (step S304) and enters a power saving state (defined as a chipset C1 state herein) (step S305), and asserts an LDT_STOP pin (disconnection, LDTSTOP#=LOW) to disable an LDT bus connecting the processor and the chipset to save the LDT bus power (step S306).

Next, it is determined whether a request (defined as a bus master cycle herein) for data transaction required during the power saving process is issued to the chipset (step S307). If the request is issued to the chipset, the chipset deasserts the LDT_STOP pin (connection, LDTSTOP#=HIGH) to enable the LDT bus (step S308) and transmits the request to the processor. When data transaction is complete, the chipset asserts the LDT_STOP pin (disconnection, LDTSTOP#=LOW) to disable the LDT bus (step S309), and the process proceeds to step S307.

Next, if the chipset does not receive any requests, it is then determined whether an IRQ from a device is received (step S310), and, if not, the process proceeds to step S307. If an IRQ is received, the chipset wakes from the power saving state (the chipset state C1) (step S311), deasserts the LDT_STOP pin (connection, LDTSTOP#=HIGH) to enable the LDT bus (step S312), and transmits the IRQ to the processor via the LDT bus (step S313). When receiving the IRQ, the processor is waked up from the C1 state (a power saving state) to the C0 state (an operational state) (step S314).

Figure 4:
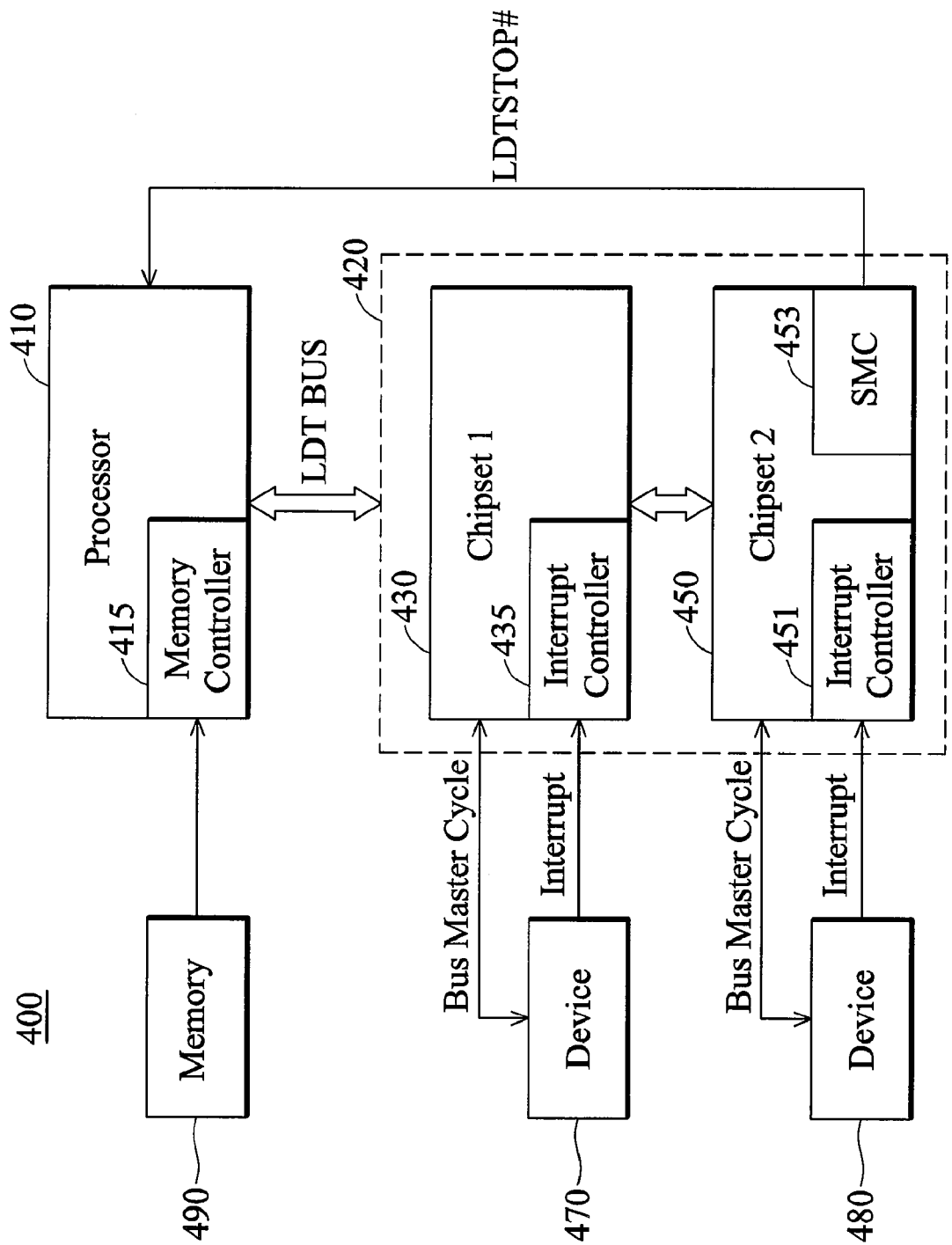
FIG. 4 is a schematic view of another embodiment of a computer system.

FIG. 4 is a schematic view of another embodiment of a computer system.

The computer system 400 comprises a processor 410 and a main chipset 420 coupled to processor 410 via an LDT bus. Processor 410 further comprises a memory controller 415. Main chipset 420 further comprises, but is not limited to, a first chipset 430 and a second chipset 450. First chipset 430 further comprises an interrupt controller 431. Second chipset 450 further comprises an interrupt controller 451 and a SMC 453. Additionally, first chipset 430 may be a north bridge chipset while second chipset 450 may be a south bridge chipset.

When data transaction between processor 410 and second chipset 450 is required, the processing is similar to that described in FIG. 2, which is not further described in the following.

When an operating system enters a power saving mode, processor 410 enters the C1 state and first chipset 430 and second chipset 450 enter a power saving state (the chipset C1 state herein) respectively. When data transaction between processor 410 and first chipset 430 is required during the power saving process, device 470 issues a request (defined as a bus master cycle herein) to chipset 430. When receiving the request, chipset 430 sends a message to second chipset 450 to notify the data transaction. When receiving the message, second chipset 450 deasserts the LDT_STOP pin (connection, LDTSTOP#=HIGH) using SMC 453 to enable the LDT bus and transmits the request to processor 410. When receiving the request, memory controller 415 of processor 410 accesses data from memory 270. When data transaction is complete, chipset 450 asserts the LDT_STOP pin (disconnection, LDTSTOP#=LOW) using SMC 453 to disable the LDT bus. It is noted that processor 210 is still in the C1 state and chipset 230 is still in the power saving state (the chipset C1 state) when the described process is implemented.

Further, when device 470 sends an IRQ to first chipset 430, interrupt controller 435 receives the IRQ and first chipset 430 is waked up from the power saving state (the chipset C1 state). Next, first chipset 430 transmits the IRQ to second chipset 450. When interrupt controller 451 receives the IRQ, second chipset 450 is waked up from the power saving state (the chipset C1 state) and deasserts the LDT_STOP pin (connection, LDTSTOP#=HIGH) using SMC 453 to enable the LDT bus. Second chipset 450 then transmits the IRQ to processor 410 via the LDT bus and processor 410 is waked up from the C1 state (a power saving state) to the C0 state (an operational state).

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power saving method for a computer system, comprising:

performing a halt instruction to enable a processor to enter a power saving state from an operational state;

broadcasting a sleep message by the processor;

receiving the sleep message by a chipset and entering the power saving state;

asserting a hardware pin by the chipset to disable a data bus connecting the processor and the chipset;

determining whether a request for data transaction required during the power saving status is issued to the chipset;
if the request is issued to the chipset, deasserting the hardware pin by the chipset to enable the data bus;
transmitting the request to the processor; and
when data transaction is complete, asserting the hardware pin by the chipset to disable the data bus.

2. The power saving method as claimed in claim 1, further comprising:
determining whether an interrupt request (IRQ) from a device is received;
if the IRQ is received, waking the chipset from the power saving state;
deasserting the hardware pin by the chipset to enable the data bus;
transmitting the IRQ by the chipset to the processor via the data bus; and
when receiving the IRQ, waking the processor from the power saving state.

3. The power saving method as claimed in claim 1, wherein the power saving state is C1 state according to an Advanced Configuration and Power Interface (ACPI) specification.

4. A computer system, comprising:
a processor, performing a halt instruction to enter a power saving state from an operational state and broadcasting a sleep message; and
a first chipset coupled to the processor, receiving the sleep message and entering the power saving state, asserting a hardware pin to disable a data bus connecting the processor, determining whether a first request for data transaction required is received during the power saving status, if the first request is received, deasserting the hardware pin to enable the data bus, and transmitting the first request to the processor, and, when data transaction is complete, asserting the hardware pin to disable the data bus.

5. The computer system as claimed in claim 4, wherein:
the first chipset determines whether a first IRQ from a device is received, if the first IRQ is received, the processor wakes up from the power saving state, deasserts the hardware pin to enable the data bus, and transmits the first IRQ to the processor via the data bus; and
the processor is awakened from the power saving state when the first IRQ is received.

6. The computer system as claimed in claim 5, wherein the processor further accesses data from a memory when the first request for data transaction is received.

7. The computer system as claimed in claim 6, wherein the first chipset further comprises:
an interrupt controller for receiving the first IRQ; and
a SMC for deasserting the hardware pin to enable the data bus when the first IRQ is received.

8. The computer system as claimed in claim 4, further comprising:
a second chipset coupled to the first chipset, entering a power saving state when the sleep message from the processor is received, determining whether a second request for data transaction is received during the power saving status, and, if the second request is received, sending a message to the first chipset for notification.

9. The computer system as claimed in claim 8, wherein the first chipset deasserts the hardware pin to enable the data bus and transmits the second request to the processor.

10. The computer system as claimed in claim 9, wherein the second chipset receives a second IRQ from another device and is waked up from the power saving state and transmits the second IRQ to first chipset.

11. The computer system as claimed in claim 10, wherein:
when the second IRQ is received, the first chipset is waked up from the power saving state, deasserts the hardware pin to enable the data bus, and transmits the second IRQ to the processor; and
the processor is waked up from the power saving state.

12. The computer system as claimed in claim 4, wherein the power saving state is C1 state according to an Advanced Configuration and Power Interface (ACPI) specification.

13. A power saving method, comprising:
receiving a sleep message by a chipset;
asserting a hardware pin to disable a data bus connecting a processor and a chipset;
deasserting the hardware pin to enable the data bus when a request for data transaction being issued to the chipset;
transmitting the request to the processor; and
asserting the hardware pin by the chipset to disable the data bus when data transaction is complete.

14. The power saving method as claimed in claim 13, further comprising performing a halt instruction to enter a power saving state from an operational state.

15. The power saving method as claimed in claim 14, wherein the request for data transaction being issued during the power saving state.

16. The power saving method as claimed in claim 14, further comprising:
deasserting the hardware pin to enable the data bus when an interrupt request (IRQ) being received by the chipset;
transmitting the IRQ to the processor via the data bus; and
waking the processor from the power saving state.

17. The power saving method as claimed in claim 14, wherein the power saving state is C1 state according to an Advanced Configuration and Power Interface (ACPI) specification.

* * * * *